(12) United States Patent
Champion et al.

(10) Patent No.: US 7,681,402 B2
(45) Date of Patent: Mar. 23, 2010

(54) AEROENGINE OIL TANK FIRE PROTECTION SYSTEM

(75) Inventors: Clare D Champion, Derby (GB); Philippe Christol, Derby (GB)

(73) Assignee: Rolls-Royce plc, London (GB)

( * ) Notice: Subject to any disclaimer, the term of this patent is extended or adjusted under 35 U.S.C. 154(b) by 734 days.

(21) Appl. No.: 11/222,738

(22) Filed: Sep. 12, 2005

(65) Prior Publication Data
US 2006/0075754 A1  Apr. 13, 2006

(30) Foreign Application Priority Data
Oct. 7, 2004  (GB) ................................ 0422241.0

(51) Int. Cl.
- *F02C 7/00* (2006.01)
- *F02C 7/06* (2006.01)
- *F02G 3/00* (2006.01)

(52) U.S. Cl. ...................... 60/779; 60/39.091; 60/39.08
(58) Field of Classification Search .............. 60/39.08, 60/779, 39.091, 39.83; 184/6.11, 27.3, 96
See application file for complete search history.

(56) References Cited

U.S. PATENT DOCUMENTS

| | | | |
|---|---|---|---|
| 1,923,857 A | 8/1933 | Armantrout | |
| 2,986,003 A * | 5/1961 | Buckingham | ................ 60/246 |
| 2,991,845 A | 7/1961 | Scheffler | |
| 3,658,153 A | 4/1972 | Berman | |
| 3,722,212 A | 3/1973 | Stein | |
| 4,170,873 A | 10/1979 | Milo | |
| 4,245,465 A | 1/1981 | Milo | |
| 4,446,377 A * | 5/1984 | Kure-Jensen et al. | ......... 290/52 |
| 4,696,156 A | 9/1987 | Burr | |
| 2002/0000479 A1 * | 1/2002 | Howard | ...................... 239/124 |
| 2006/0054406 A1 * | 3/2006 | Delaloye | ................... 184/6.11 |

FOREIGN PATENT DOCUMENTS

| | | |
|---|---|---|
| GB | 1 167 692 SP | 10/1969 |
| JP | 59 147 803 AB | 8/1984 |

* cited by examiner

*Primary Examiner*—Michael Cuff
*Assistant Examiner*—Gerald L Sung
(74) *Attorney, Agent, or Firm*—Jeffrey S. Melcher; Manelli Denison & Selter PLLC

(57) ABSTRACT

A gas turbine engine comprising an oil system and a gearbox, the gearbox is driven by at least one engine shaft, the oil system comprises a pump drivingly connected to the gearbox, an oil tank connected to the pump via a supply pipe and a delivery pipe connecting the pump to the engine for delivery of oil thereto, an anti-siphon pipe is connected between the tank and the delivery pipe to provide an excess oil flow to the engine characterized in that the anti-siphon pipe includes a variable flow valve for regulating the flow of oil passing therethrough such that at low engine speeds an adequate supply of oil is provided to a sight glass in the tank.

13 Claims, 3 Drawing Sheets

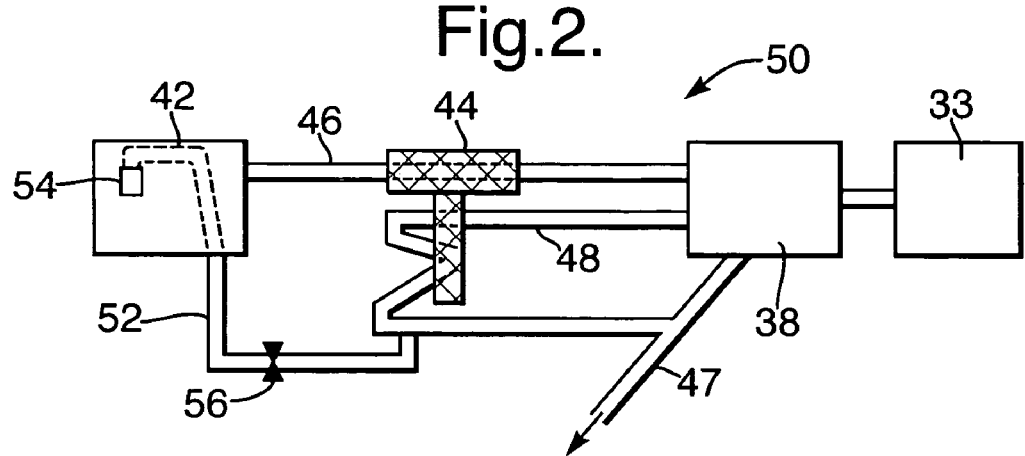
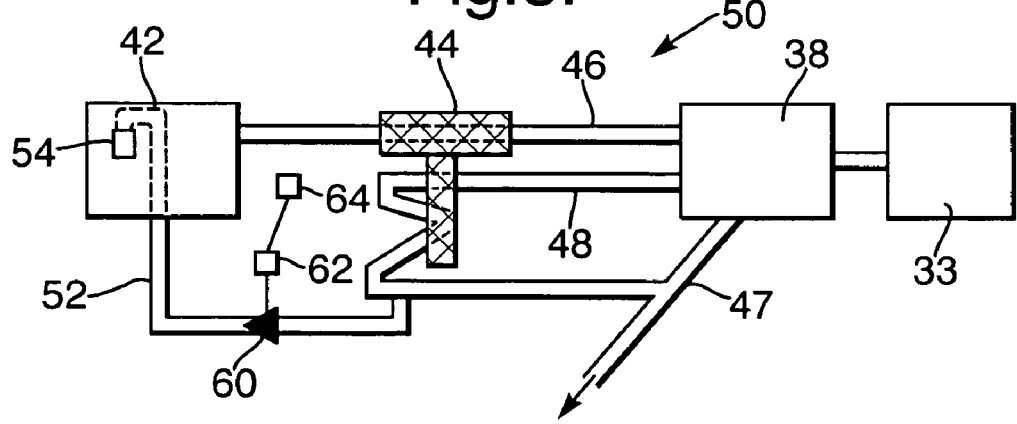

AEROENGINE OIL TANK FIRE PROTECTION SYSTEM

FIELD OF THE INVENTION

The present invention relates to an oil tank fire protection arrangement and a method of operating the same and in particular to providing such a system for a gas turbine engine.

BACKGROUND OF THE INVENTION

In a conventional gas turbine engine an oil system incorporates an anti-siphon pipe. This pipe returns part of the engine oil flow back to the tank (see FIG. 2). The function of the anti-siphon spill is to provide an excess of oil flow where the engine oil flows need adjusting. The anti-siphon pipe provides an air break in the system to avoid the oil draining to the lowest point in the system. Further, the anti-siphon pipe provides some cooling for a sight glass, used for monitoring the oil reserve, in the oil tank.

However, this arrangement is not capable of providing adequate cooling oil for the sight glass to satisfy the minimum fire protection time required by the FAA and CAA. This problem is particularly apparent as the cooling oil of the conventional arrangement is driven by means associated to the engine speed, thus where the engine is at low power the sight glass is particularly prone to failure through fire damage.

The object of the present invention is to provide the means to deliver adequate cooling oil to the sight glass, whilst maintaining the requirement for excess of oil flow where the engine oil flows need adjusting and an air break in the system.

SUMMARY OF THE INVENTION

In accordance with the present invention a gas turbine engine comprises an oil system and a gearbox, the gearbox is driven by at least one engine shaft, the oil system comprises a pump drivingly connected to the gearbox, an oil tank connected to the pump via a supply pipe and a delivery pipe connecting the pump to the engine for delivery of oil thereto, an anti-siphon pipe is connected between the tank and the delivery pipe to provide an excess oil flow to the engine characterised in that the anti-siphon pipe includes a variable flow valve for regulating the flow of oil passing therethrough such that at low engine speeds an adequate supply of oil is provided to a sight glass in the tank.

Preferably, the oil system further comprises a second pipe connecting between the pump and the anti-siphon pipe, the second pipe.

Preferably, the engine comprises a heat exchanger and at least one of the pipes is routed therethrough.

Preferably, the variable flow valve is operable via a sprung loaded valve, which is responsive to the oil pressure in the anti-siphon pipe, to increase oil flow therethrough at low engine speeds.

Alternatively, the variable flow valve is operable via a drive means; the drive means is operated via an engine control system. The drive means is an electrical means such as an electrical motor. Alternatively, the drive means is a piston.

Preferably, the engine control system operates the variable flow valve in response to an engine parameter, the engine parameter being from the group comprising engine shaft speed or oil pressure.

Preferably, the supply of oil provided to the sight glass in the tank is adequate to prevent failure of the sight glass through fire.

Preferably, the supply of oil provided to the sight glass in the tank is adequate for at least 15 minutes.

BRIEF DESCRIPTION OF THE DRAWINGS

The present invention will be more fully described by way of example with reference to the accompanying drawings in which:

FIG. 2 is a diagrammatic representation of a prior art oil system of the gas turbine engine of FIG. 1.

FIG. 3 is a diagrammatic representation of the present invention oil system for a gas turbine engine.

DETAILED DESCRIPTION OF THE INVENTION

Figure 1:
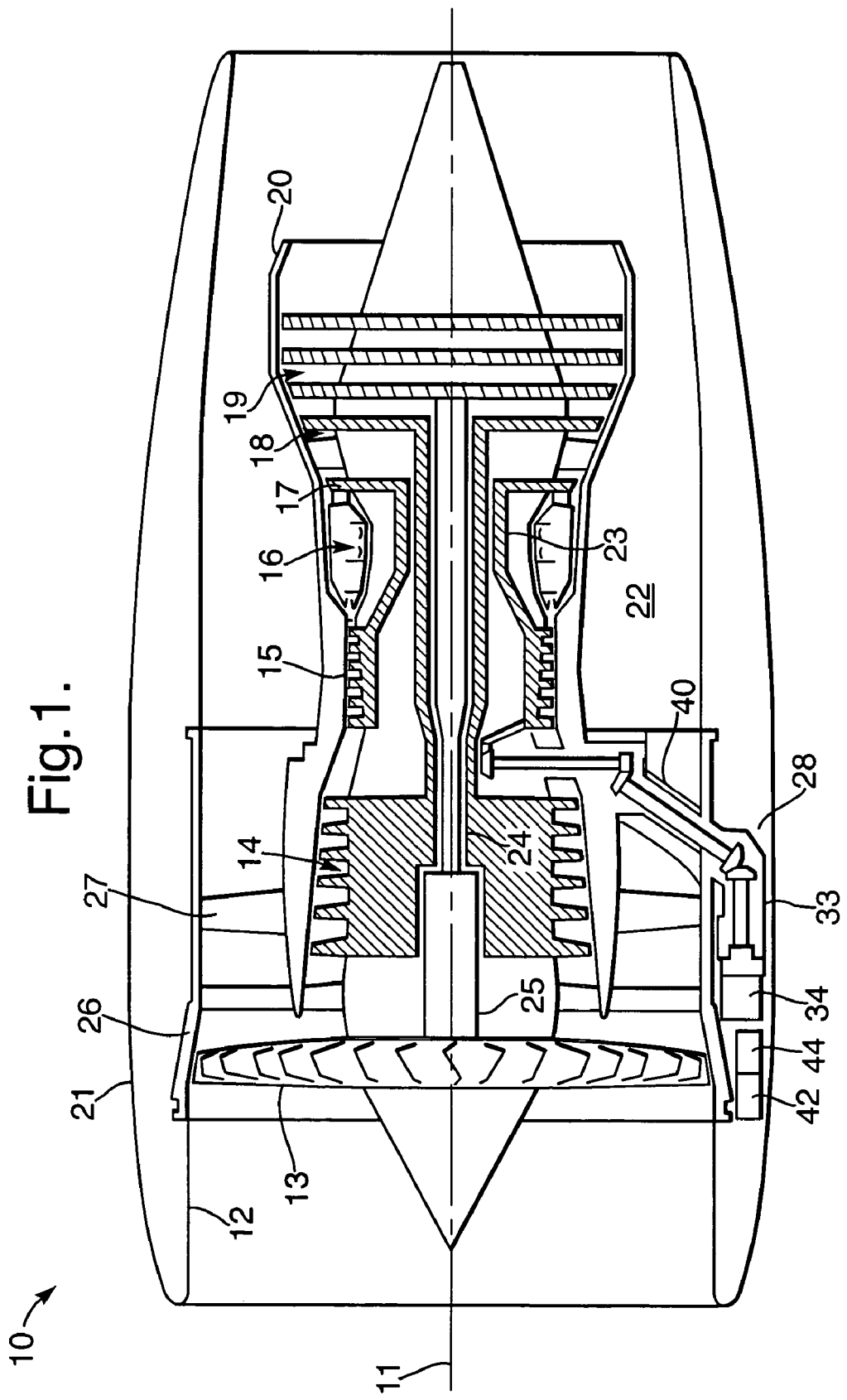
FIG. 1 is a schematic section of part of a ducted fan gas turbine engine incorporating the present invention.

With reference to FIG. 1, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts 23, 24, 25.

The fan 13 is circumferentially surrounded by a structural member in the form of a fan casing 26, which is supported by an annular array of outlet guide vanes 27.

The engine 10 further comprises a gearbox/generator assembly 28 used for engine start up and for generating electricity once the engine has been started and working in convention fashion. The generated electricity is used for engine and associated aircraft electrical accessories as well known in the art. The gearbox/generator assembly 28 is drivingly connected to the high-pressure shaft 24, however, in other embodiments may be driven by any one or more of the shafts 24, 25. In this embodiment, the gearbox/generator assembly 28 comprises an internal gearbox connecting a first drive shaft to the high-pressure shaft 23, an intermediate gearbox connecting the first drive shaft to a second drive shaft and an external gearbox 33 drivingly connected to the second drive shaft. The external gearbox 33 is drivingly connected to a generator 34 that is capable of the aforesaid engine operation. An oil tank 42 is mounted to the engine casing 26 and is in fluid communication with the gearbox 33 through a fuel oil heat exchanger 44. The oil tank 42, heat exchanger 44, generator 34 and external gearbox 33 are housed within the nacelle 21. The first drive shaft, intermediate gearbox and the second drive shaft are housed within a bypass duct splitter fairing 40.

Referring now to FIG. 2, an oil system 50 of the conventional gas turbine engine 10 comprises a pump 38 and the oil tank 42 connected via a first pipe 46. The pipe 46 is routed through a heat exchanger 44 for cooling the oil flowing therethrough. A second pipe 48 also passes through the heat exchanger 44 from the pump 38 and connects with a third pipe 47 from the pump 38. The third pipe 47 delivers oil to certain engine systems (not shown) such as bearings. The oil system 50 further incorporates an anti-siphon pipe 52, which connects the second pipe 48 to the oil tank 42. The anti-siphon pipe 52 returns part of the engine oil flow back to the tank 42 through an anti-siphon restrictor 56.

Figure 4:
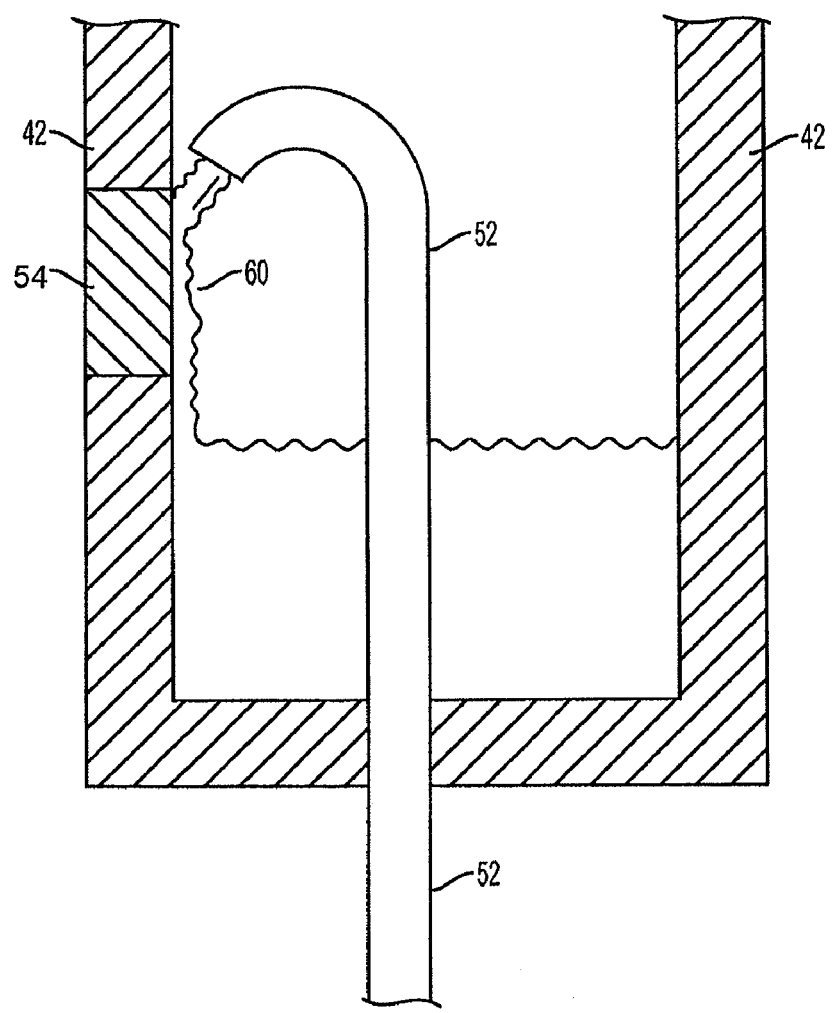
FIG. 4 illustrates a side cutaway view of the oil system in operation.

The function of the anti-siphon spill pipe 52 is to provide an excess of oil flow when the engine oil flow requirement varies throughout engine operation. The anti-siphon pipe 52 provides an air break in the system 50 to avoid the oil draining to the lowest point in the system 50. Further, the anti-siphon pipe 52 provides a flow of cooling oil over a sight glass 54 in the wall of the tank 42, as shown in 60 in FIG. 4. The sight glass 54 is used for monitoring the oil reserve in the oil tank 42.

However, this arrangement is not capable of providing adequate cooling for the sight glass 54 for the minimum fire protection time required by the FAA and CAA. This problem is particularly apparent as the cooling oil of the conventional arrangement is driven from the gearbox 33, the performance of which is dictated by engine speed. Thus where the engine 10 is at low power or even windmill (no power) there is little or no cooling oil flow to the sight glass 54, which is therefore prone to failure through fire damage.

The anti-siphon oil flow pipe and restrictor are sized for the maximum take-off (MTO) condition i.e. when the engine is producing maximum or near maximum power. The oil flow is mainly dictated by the anti-siphon restrictor size and the HP shaft rotational speed, noting that the oil pump is driven off the external gearbox, itself driven by the HP shaft. The anti-siphon restrictor size is a fixed diameter. As a consequence the flow is very low and insufficient at windmill condition and sub-idle HP shaft speed.

FIG. 3 where like elements are given the same reference numerals as in FIG. 2; the anti-siphon pipe restrictor 56 is replaced with a valve 60 capable of increase the oil flow at sub-idle and windmill conditions. Below a predetermined HP shaft speed or gearbox output the valve 60 is open to providing an increased oil flow back to the tank 42, and therefore increased cooling to the sight glass 54. During higher engine speeds and gearbox outputs, the valve 60 is substantially closed and essentially behaves like a fixed restrictor.

In a preferred embodiment, the valve 60 is a spring-loaded poppet valve and is driven by the oil pressure in the anti-siphon pipe 52. Alternatively, the valve 60 is driven by compressed air from a compressor of the engine controlled by a servo valve.

In yet another embodiment, the valve 60 is operable via a drive means 62. The drive means 62 operates the valve 60 dependent on a function of an engine parameter such as the HP shaft speed or oil pressure the engine control system 64 (known in the art as a FADEC). The drive means 62 is preferably an electrical means such as an electrical motor, alternatively the drive means 62 is a piston.

We claim:

1. A method of adjusting oil flow to a gas turbine engine comprising providing a gearbox driven by at least one engine shaft, an oil system comprising a pump drivingly connected to the gearbox, an oil tank connected to the pump via a supply pipe, a delivery pipe connecting the pump to the engine for delivery of oil thereto, and an anti-siphon pipe connected between the tank and the delivery pipe to provide an excess oil flow to the engine and an oil flow over a sight glass in the tank, the anti-siphon pipe including a variable flow valve for regulating the flow of oil passing therethrough, wherein the variable flow valve is operable via a drive means and the drive means is operated via an engine control system, the method further comprising the steps of:
operating the gas turbine engine to drive the gear box and oil system, thereby supplying oil to the engine; and
opening the valve to increase oil flow at low engine speeds to provide adequate oil flow over the sight glass to provide fire protection.

2. The method according to claim 1, wherein the low engine speed comprises sub-idle or windmill speeds.

3. The method according to claim 1, wherein the engine control system operates the valve in response to shaft speed or oil pressure.

4. The method according to claim 1, wherein a sufficient amount of oil is provided to the sight glass at low engine speeds to prevent failure of the sight glass through fire.

5. The method according to claim 1, wherein the anti-siphon pipe provides a flow of oil over the sight glass.

6. A method according to claim 1, wherein the oil system further comprises a second pipe connecting the pump and the anti-siphon pipe.

7. A method according to claim 6, wherein the engine comprises a heat exchanger and at least one of the pipes is routed therethrough.

8. A method according to claim 1, wherein the variable flow valve is operable via a sprung loaded valve, the valve is responsive to the oil pressure in the anti-siphon pipe to increase oil flow therethrough at low engine speeds.

9. A method according to claim 1, wherein the drive means is an electrical means.

10. A method according to claim 1, wherein the drive means is a piston.

11. A method according to claim 1, wherein the engine control system operates the variable flow valve in response to an engine parameter, the engine parameter being from the group comprising engine shaft speed or oil pressure.

12. A method according to claim 1, wherein the supply of oil provided to the sight glass in the tank is adequate for preventing engine failure for at least 15 minutes.

13. A method of adjusting oil flow to a gas turbine engine comprising providing a gearbox driven by at least one engine shaft, an oil system comprising a pump drivingly connected to the gearbox, an oil tank connected to the pump via a supply pipe, a delivery pipe connecting the pump to the engine for delivery of oil thereto, and an anti-siphon pipe connected between the tank and the delivery pipe to provide an excess oil flow to the engine and an oil flow over a sight glass in the tank, the anti-siphon pipe including a variable flow valve for regulating the flow of oil passing therethrough, the method further comprising the steps of:
operating the gas turbine engine to drive the gear box and oil system, thereby supplying oil to the engine; and
opening the valve to increase oil flow at low engine speeds to provide adequate oil flow over the sight glass.

* * * * *